March 18, 1930. C. NUHRING 1,750,964
HOSE RACK
Filed Sept. 6, 1927
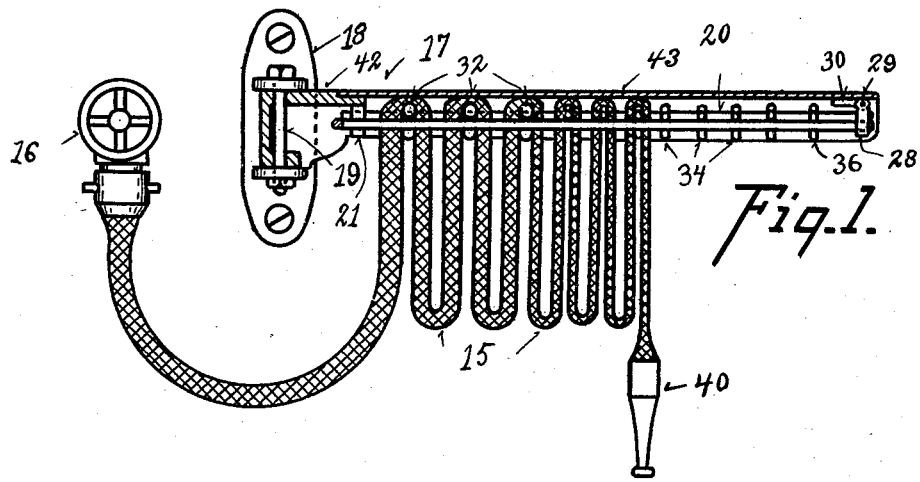
Fig. 1.
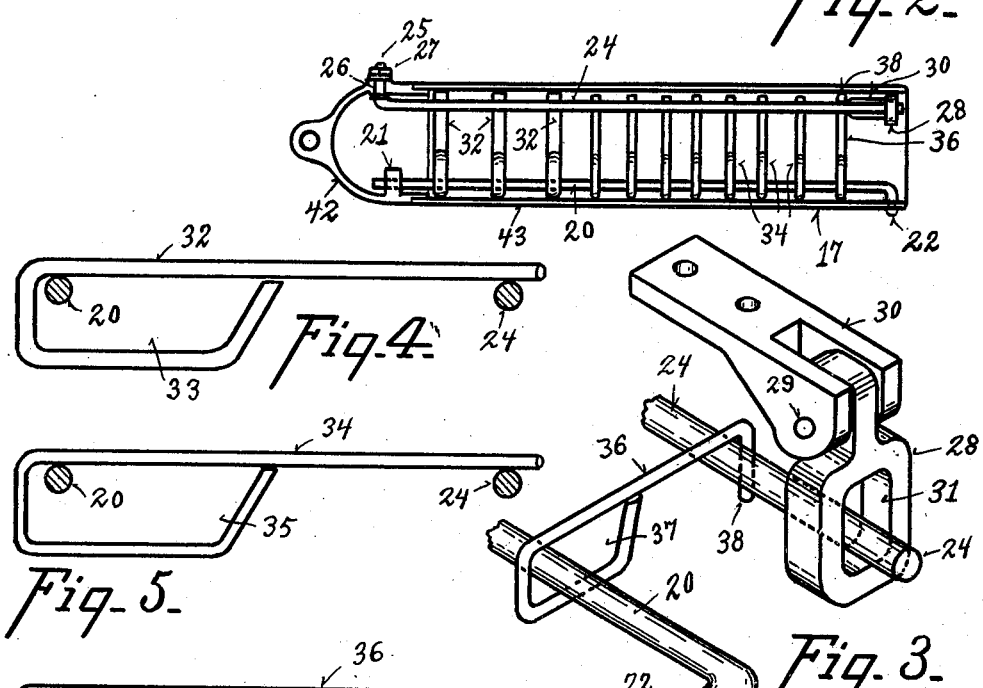
INVENTOR.
Charles Nuhring,
BY C. W. Miles,
ATTORNEY.

Patented Mar. 18, 1930

1,750,964

UNITED STATES PATENT OFFICE

CHARLES NUHRING, OF CINCINNATI, OHIO

HOSE RACK

Application filed September 6, 1927. Serial No. 217,739.

My invention relates to improvements in hose rack. One of its objects is to provide improved means to support and readily release fire hose. Another object is to provide improved means to hold back or retard the flow of water through the hose until after the hose is released, in the event that an operator inadvertently turned on the water before releasing the hose. Another object is to provide more simple and reliable means to support and release fire hose. My invention also comprises certain details of form and arrangement and combination of components, all of which will be fully set forth in the description of the accompanying drawings, in which:

Fig. 1 is a side elevation of a fire hose and supporting and releasing means embodying my improvements, and in which one side of the supporting rack is broken away to expose the hose supporting and releasing means.

Fig. 2 is a bottom plan of the hose supporting rack detached.

Fig. 3 is an enlarged detail view of a portion of the supporting and releasing means.

Fig. 4 is a plan of one type of hose supporting cross-bars employed.

Fig. 5 is a view similar to Fig. 4 illustrating another type of cross-bar employed.

Fig. 6 is a view similar to Fig. 4 of another type of cross-bar employed.

The accompanying drawings illustrate one embodiment of my invention in which 15 represents a fire hose, 16 a valve by means of which water under pressure may be turned into the hose when required. A hose rack frame 17 is pivotally mounted relative to a rigidly positioned wall bracket 18 by means of a hinge rod or bolt 19.

A guide rod 20 is rigidly mounted relative to the frame 17, being located within and beneath the frame 17 and extending along one side thereof. As shown one end of said rod 20 is supported by being passed through a lug or projection 21 while the opposite end of the rod 20 has a shoulder and reduced section 22 which extends through the side wall of frame 17 and is headed or riveted to the frame 17.

Another guide rod 24 located beneath and along the opposite side of the frame 17 has one end 25 turned at substantially right angles and journaled in a perforation or journal bearing 26 in the side wall of frame 17. A nut 27 on the end of the rod 24 outside of the frame 17 serves to hold the rod 24 against displacement from its journal bearing 26. At its opposite end the rod 24 is detachably engaged with the eye 31 of a link 28, which is in turn pivotally attached by means of a pin 29 to a forked bracket 30, which is rigidly attached to the inner and under face of the frame 17. By swinging the link 28 upon the pin 29 the end of the rod 24 may be disengaged from the eye 31 of link 28, allowing the rod 24 to hang in a vertical position extending downwardly from its journal bearing 26.

A series of cross-bars 32, see Fig. 4, of relatively thick and heavy material, each provided with an elongated eye 33, are strung non-detachably at one end upon the guide rod 20, and located at the inner or pivoted end of the frame 17. Another series of cross-bars 34, see Fig. 5, each provided at one end with an elongated eye 35, are similarly strung by means of their eyes 35 upon the guide rod 20, and located along the middle portion and free end of the frame 17. Another cross-bar 36, see Fig. 6, is provided with an elongated eye 37 by means of which it is strung upon the guide rod 20, and also provided with a hook 38 at its end opposite to the eye 37. The cross-bar 36 is located at the free end of the frame 17 between the cross-bars 34 and the link 28. When not in use the cross-bars 32, 34 and 36 hang vertically down from the guide bar 20 upon which they are suspended by their respective eyes 33, 35 and 37. When required to support the respective loops of the fire hose, the several cross-bars 32, 34 and 36 are lifted successively into position so that their free ends rest upon and are supported in a horizontal position by the guide rod 24, and with each of said cross-bars supporting a loop of the fire hose.

In the event of the fire hose being required for use an operator should first grasp the hose nozzle 40, and either pull on the hose thereby, or grasp also the cross-bar 36 and pull it so as to cause the hooked end 38 to engage the link 28 and swing the link 28 so as to free the end of the guide rod 24 from the eye of the link 28, whereupon the guide rod 24 will swing to a vertical position and thereby release the free ends of all of the cross-bars 32 and 34, and thereby disengage the several loops of the hose from the hose rack allowing the hose to fall upon the floor in such position as to be free from loops or kinks, and ready for instant use. The valve 16 should then be opened.

It frequently happens that an operator under the stress of excitement opens the valve and admits water under pressure to the hose before detaching the hose from the rack. In order that a premature opening of the valve before detaching the hose from the rack may not result in cramping the apparatus, loss of time or injury to the operator or others, when water is admitted to the hose, the hose close to the valve becomes distended but due to the strength and size of the first four or five cross-bars 32, and the limited space between said larger size bars and the roof of the frame 17, the hose has a constricted area above each of the cross-bars 32, which holds back and progressively restricts the flow of water, substantially as shown in Fig. 1, so that practically no water flows at the nozzle until the operator has grasped the nozzle and released the guide rod 24 from the supporting link 28, whereupon the strictures upon the hose are released and the water flows at the nozzle. As illustrated the frame 17 is composed of a cast metal section 42 and a relatively light weight sheet metal section 43 attached thereto.

By supporting the free end of the journaled guide rod by means of a link, the cross-bars when pulled endwise of the guide rods exert a direct pressure against the side of the link tending to shift the link and release the free end of the journaled guide rod. I am thus enabled to provide a more certain and reliable and readily actuated hose supporting and releasing apparatus, which is not liable to complications or to fail in an emergency, and is released from or through the natural and unconscious act of the operator drawing the hose nozzle to a position where water may be discharged upon a fire.

The apparatus herein shown and described is capable of considerable modification within the scope of the claims without departing from the spirit of my invention.

What I claim is:

1. A hose rack comprising a supporting frame, a first guide rod stationarily mounted upon and along one side of said frame, a second guide rod pivotally attached to said frame at one end and detachably supported relative to said frame at its opposite end, a link pivotally attached to said frame and provided with a perforation to receive and detachably support the free end of said second guide rod, said second guide rod extending along the opposite side of said frame substantially parallel to said stationary guide rod, and a series of cross-bars attached by means of eyes to said stationary guide rod and adapted to be supported at their free ends upon said second guide rod and to support a series of loops of hose, and to release said cross-bars and hose loops when said second guide rod is disengaged from its supporting link, and a cross-bar having a hook at its free end to engage over said second guide rod in position to engage said link and disengage the free end of said second guide rod from said link.

2. A hose rack comprising a supporting frame, a first guide rod stationarily mounted upon and along one side of said frame, a second guide rod substantially parallel to said first guide rod pivotally attached at right angles to its axis to said frame at one end and detachably supported relative to said frame at its opposite end, a supporting link pivotally attached at one end to said supporting frame and in turn detachably supporting the free end of said second guide rod relative to said frame, said second guide rod extending along the opposite side of said frame from said first guide rod, and a series of cross-bars attached by means of eyes to said stationary guide rod and adapted to be supported at their free ends upon said second guide rod and to support a series of loops of hose and a member extending from said first guide to said second guide member for actuating said supporting link to release said cross bars and hose loops.

In testimony whereof I have affixed my signature.

CHARLES NUHRING.